United States Patent
Wanittiyaubon et al.

(10) Patent No.: US 11,938,747 B2
(45) Date of Patent: Mar. 26, 2024

(54) DATAPAGE FOR A SECURITY DOCUMENT AND A METHOD OF MANUFACTURING THE SAME

(71) Applicant: LINXENS HOLDING, Mantes-la-Jolie (FR)

(72) Inventors: Sunthari Wanittiyaubon, Phra Nakorn Si Ayutthaya (TH); Arporn Sungkhapun, Phra Nakorn Si Ayutthaya (TH); Somchard Phannam, Phra Nakorn Si Ayutthaya (TH); Khietisak Khaipho, Phra Nakorn Si Ayutthaya (TH); Thanapong Phothisarn, Phra Nakorn Si Ayutthaya (TH); Wittaya Songsawat, Phra Nakorn Si Ayutthaya (TH)

(73) Assignee: LINXENS HOLDING, Mantes-la-Jolie (FR)

( * ) Notice: Subject to any disclaimer, the term of this patent is extended or adjusted under 35 U.S.C. 154(b) by 204 days.

(21) Appl. No.: 17/612,897

(22) PCT Filed: May 20, 2019

(86) PCT No.: PCT/IB2019/000986
§ 371 (c)(1),
(2) Date: Nov. 19, 2021

(87) PCT Pub. No.: WO2020/234620
PCT Pub. Date: Nov. 26, 2020

(65) Prior Publication Data
US 2022/0219480 A1 Jul. 14, 2022

(51) Int. Cl.
B42D 25/24 (2014.01)
B42D 25/30 (2014.01)
G06K 19/04 (2006.01)

(52) U.S. Cl.
CPC ............. *B42D 25/24* (2014.10); *B42D 25/30* (2014.10); *G06K 19/041* (2013.01)

(58) Field of Classification Search
CPC ....... B42D 25/24; B42D 25/30; G06K 19/041
(Continued)

(56) References Cited

U.S. PATENT DOCUMENTS

| | | | | |
|---|---|---|---|---|
| 2009/0097944 | A1* | 4/2009 | van den Berg | B42D 25/00 281/21.1 |
| 2015/0344138 | A1* | 12/2015 | Wen | B64C 1/12 219/544 |
| 2021/0039418 | A1* | 2/2021 | Dhillon | B42D 25/36 |

FOREIGN PATENT DOCUMENTS

| | | |
|---|---|---|
| CN | 101415566 A | 4/2009 |
| CN | 205622855 U | 10/2016 |

(Continued)

OTHER PUBLICATIONS

International Search Report and Written Opinion of the International Searching Authority for related International Patent Application No. PCT/IB2019/000986, dated Feb. 12, 2020, 8 pages.

*Primary Examiner* — Toan C Ly
(74) *Attorney, Agent, or Firm* — DITTHAVONG, STEINER & MLOTKOWSKI

(57) ABSTRACT

A datapage of a security document includes a non-planar end face that is to be connected to a hinge material, thereby providing for increased overall contact surface area between hinge material and the datapage. Consequently, a respective connecting portion including such an interdigitated structure may provide for superior robustness while still ensuring a high degree of integrity of the datapage and a robust mechanical connection to the remainder of the security document.

19 Claims, 9 Drawing Sheets

(58) Field of Classification Search
USPC .......................................................... 235/488
See application file for complete search history.

(56) References Cited

FOREIGN PATENT DOCUMENTS

| | | |
|---|---|---|
| CN | 109016790 A | 12/2018 |
| CN | 208376104 U | 1/2019 |
| DE | 10 2010 054480 A1 | 6/2012 |
| EP | 1 574 359 A2 | 9/2005 |
| WO | 2020234620 A1 | 11/2020 |

* cited by examiner

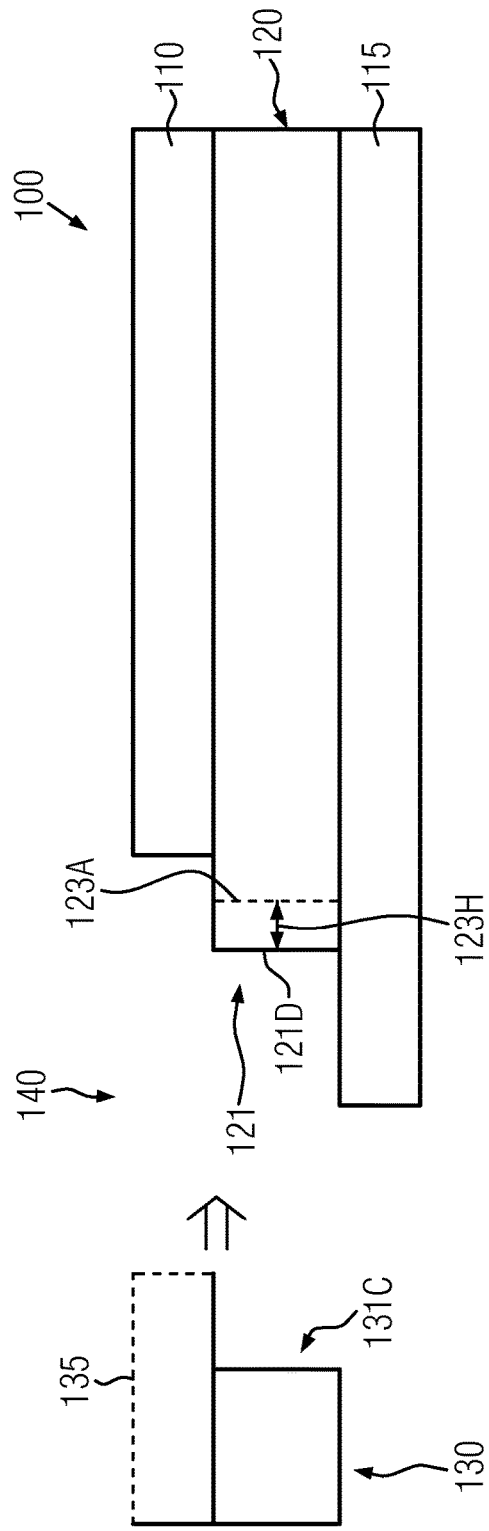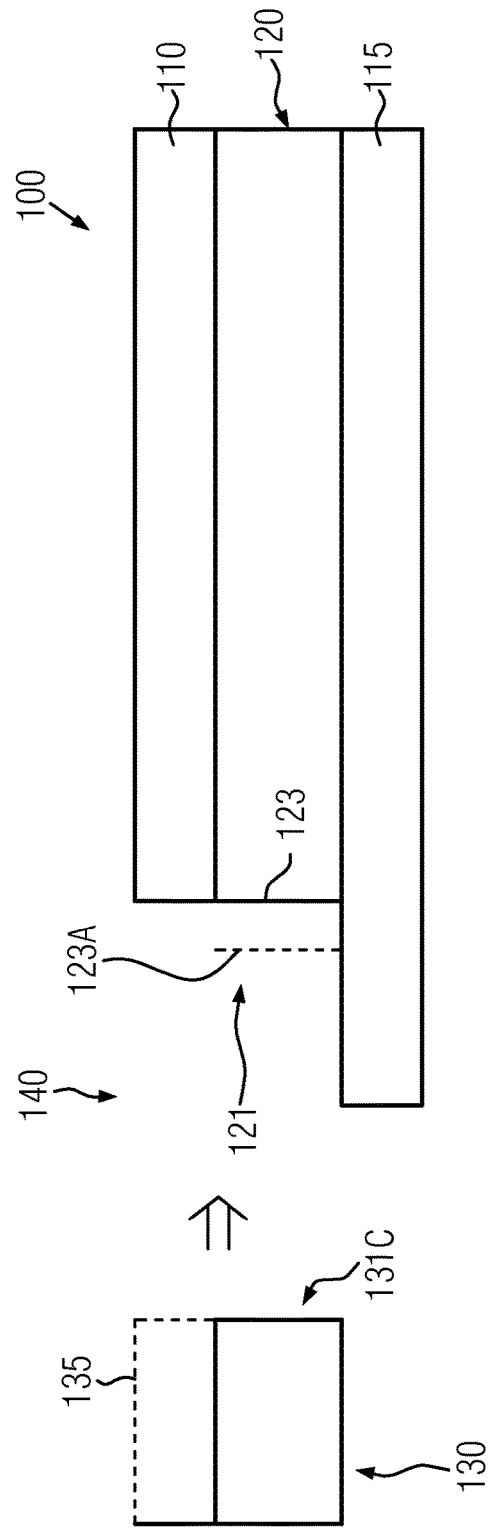

DATAPAGE FOR A SECURITY DOCUMENT AND A METHOD OF MANUFACTURING THE SAME

TECHNOLOGICAL FIELD

Generally, the present disclosure relates to security documents and, in particular, to datapages or data sheets and respective coupling or connecting portions thereof, so as to provide for superior tampering resistance of respective security documents.

BACKGROUND

Security documents, such as passports, and the like, typically include sensitive data of one or more persons associated with the security document. Such data may include image data in the form of images, text, and the like, security features in the form of indentations, and the like, electronically readable data stored in a corresponding RFID chip, and the like. Irrespective of the type of information or data to be stored in a respective security document, it is mandatory that any tampering with this data or information has to be prevented as much as possible, wherein preferably any attempt of tampering or otherwise manipulating the sensitive data will result in recognizable traces on the security document.

Frequently, a security document may have at least one datapage or sheet that carries the sensitive data or information in combination with other pages are sheets of less critical contents, for instance in a passport, and the like. Therefore, the datapage including the sensitive information may have to be combined with one or more other less critical pages or sheets, for instance the cover of a passport, the additional pages in a passport, and the like, thereby imposing certain requirements on the datapage in addition to the high tampering resistance thereof. For example, the security document may have to meet certain requirements regarding the handling thereof, the durability, for instance in opening and closing a passport, and generally resistance with respect to environmental conditions, and the like.

In view of tampering resistance, durability, and the like, certain plastics have proven to be viable candidates for forming high-quality datapages of security documents. In particular, polycarbonate is frequently used in the form of sheets that may be laminated so as to form, after having inserted sensible data or information, a single non-separable sheet or block of material, which may not readily be tampered with when attempting to manipulate the sensitive data included in the plastic datapage. Although many plastic materials, such as polycarbonate, may exhibit highly advantageous characteristics in terms of durability, resistance against environmental conditions and also chemicals, possibly used for tampering with sensitive data, mechanical impact, and the like, it turns out that these types of materials may not satisfactorily meet other requirements of security documents.

For example, as already discussed above, the datapage may have to be compiled with other pages or sheets, which may require a high degree of flexibility of a respective connecting portion, for instance when considering a passport, which may have to be opened and closed frequently over a long time period of several years. Any such sophisticated requirements may not readily be met by plastic materials, such as polycarbonate. That is, despite the superior characteristics with respect to tampering resistance a respective degree of flexibility as may be required for a connecting portion of a datapage may not lead to the desired results in terms of operability, durability, and the like. Therefore, it has been proposed to provide specifically designed materials, which may also be referred to as hinge materials, so as to specifically meet the requirements of corresponding connection portions for connecting a datapage to other components, such as the cover of a passport, and the like. On the other hand, the connection portion including the material of superior flexibility may nevertheless have to provide for a high degree of security in order to make any illegal exchange of a datapage very difficult. That is, the connection between the actual datapage and the hinge material as well as the hinge material itself should have high mechanical robustness with respect to external forces, while nevertheless providing for a desired high flexibility and durability when considering long-term use of a respective security document.

For example, it has been proposed to connect a portion of a hinge material with an upper surface portion of a datapage by gluing, laminating, and the like, which may provide for moderately high mechanical robustness and ease of manufacturing of the corresponding arrangement. In other approaches the hinge material may have been attached to the entire surface of the datapage in order to enhance the adhesion strength between the actual datapage and the hinge material, thereby, however, possibly compromising the overall material characteristics of the datapage, since the resulting material stack is no longer a uniform material as is the case for a stacked structure of polycarbonate sheets that have been laminated.

In still other approaches it has been attempted to avoid the disadvantages of the former approaches by sandwiching a portion of the hinge material between respective cover layers of the datapage, thereby obtaining relatively high mechanical robustness and adhesion strength, while at the same time the remaining portion of the datapage may maintain its structural integrity and thus maintain all the advantages associated with the usage of a polycarbonate material.

Although this approach may provide many advantages it nevertheless turns out that in particular upon using highly specific hinge materials, the durability of the respective connection portion, i.e. the portion including the hinge material and the actual datapage material, may be less than expected due to a lowering of adhesion strength between the two different materials in the course of time.

In view of the situation described above, the present disclosure relates to datapages and manufacturing techniques, in which a hinge material may be incorporated with high durability, while avoiding or at least reducing the effects of one or more of the problems identified above.

SUMMARY

The following presents a simplified summary of the disclosure in order to provide a basic understanding of some aspects of the invention. This summary is not an exhaustive overview of the invention. It is not intended to identify key or critical elements of the invention or to delineate the scope of the invention. Its sole purpose is to present some concepts in simplified form as a prelude to the more detailed description that is discussed later.

Generally, the present disclosure is based on the concept that performance of a datapage in a security document, such as a passport, and the like, may be enhanced by specifically selecting an appropriate hinge material, which in turn is appropriately connected to the actual datapage. To this end, it has been recognized that performance and in particular durability of specifically selected materials, such as nonwoven materials, may significantly be enhanced, in particular in terms of durability, by sandwiching a portion of the hinge material between respective cover layers of the datapage, wherein the surface, at which the hinge material is to abut against the central portion of the datapage, has an increased contact surface. That is, an end face of a central layer of the datapage has non-planar surface portions, which significantly increase the effective contact surface area when being contacted with the hinge material. Consequently, the hinge material may not only be in contact with the surface portions of the top and bottom cover layers of the datapage but also with the end face thereof, thereby imparting superior adhesion strength and durability to a respective connection portion formed by a part of the hinge material and a part of the datapage. Therefore, the central portion of the datapage connecting to the hinge material forms an "interdigitated" structure with the datapage material, which provides for superior mechanical characteristics compared to conventional approaches, in which a respective contact surface may merely have a planar or rectangular geometry.

In one illustrative embodiment disclosed herein a datapage for a security document includes a first cover sheet and a second cover sheet. Moreover, the datapage includes an intermediate sheet sandwiched by the first and second cover sheets, wherein the intermediate sheet has an end face for connecting to a hinge material sheet, and wherein the end face has non-planar surface portions.

According to a further illustrative embodiment disclosed herein a datapage for a security document includes a first cover sheet and a second cover sheet. Furthermore, an intermediate sheet is sandwiched by the first and second cover sheets so as to expose an end face of the intermediate sheet. Additionally, the datapage includes a hinge material sheet connected to the intermediate sheet by the end face so as to form a connection portion of an interdigitated structure.

According to still another illustrative embodiment a method of forming a datapage for a security document is provided. The method includes providing a first cover sheet, a second cover sheet and at least one intermediate sheet having a contact end face, wherein the contact end face has non-planar surface portions. The method further includes stacking the first cover sheet, the second cover sheet and the at least one intermediate sheet so as to arrange the at least one intermediate sheet between the first and second cover sheets, wherein the first and second cover sheets extend beyond the contact end face, thereby forming overlapping contact surface portions. Additionally, the method includes connecting a hinge material sheet to the contact surface portions and the contact end face, wherein the contact end face thereby forms an interdigitated structure with the hinge material sheet.

BRIEF DESCRIPTION OF THE DRAWINGS

The present disclosure may be understood by reference to the following description taken in conjunction with the accompanying drawings, in which like reference numerals identify like elements and which are not drawn to scale, and in which:

FIGS. 1C and 1D schematically illustrate cross-sectional views along the lines IC and ID of FIG. 1B according to illustrative embodiments;

DETAILED DESCRIPTION

Figure 1A:
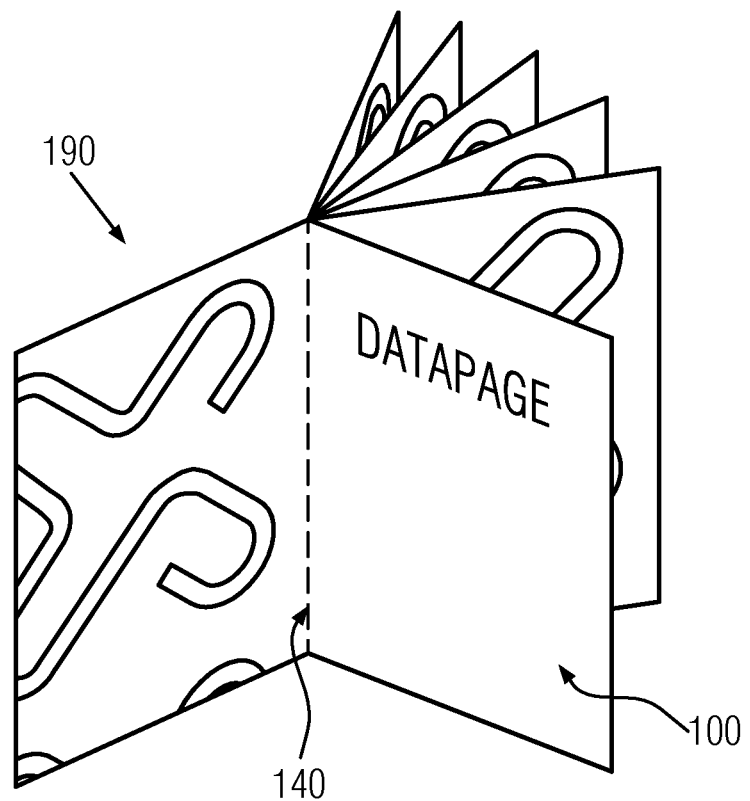
FIG. 1A schematically illustrates a perspective view of a security document including a datapage and a hinge material sheet connected to the datapage according to illustrative embodiments of the present disclosure.

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios and numerical properties of ingredients, reaction conditions and so forth used in the specification and claims are to be understood as being modified in all instances by the term "about".

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers specific goals, such as compliance with system-related and business-related constraints, which will vary from one implementation to another. Moreover, it will be appreciated that such a development effort might be complex and time-consuming, but would nevertheless be a routine undertaking with those of ordinary skill in the art having the benefit of this disclosure.

The present disclosure will now be described with reference to the attached Figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by the skilled artisans, such special definition shall be expressively set forth in the specification in a definitional manner that directly and unambiguously provides a special definition for the term or phrase.

As already briefly discussed above, the present disclosure is based on the concept that durability of a connection portion of a datapage may be enhanced by appropriately preparing at least one additional surface area, i.e., the end face of a central or intermediate sheet of the datapage, in order to provide for increased contact surface area to the hinge material. Basically, in conventional designs, the surface areas of the cover sheets may typically be used as contact surface areas for providing the adhesion strength of the connection between the hinge material and the material of the datapage when inserting a portion of the hinge material into a respective recess of the datapage. Consequently according to the principles disclosed herein, the respective end faces of the hinge material sheet and the intermediate sheet or central sheet, or at least one of the intermediate sheets, form an interdigitated structure upon connecting the hinge material to the datapage by any appropriate connection techniques, such as gluing, laminating, and the like. In this manner, even when using a very different material for the hinge sheet, such as non-woven, possibly in combination with an appropriate adhesive, superior mechanical strength of the connection and thus durability may be achieved. That is, upon selecting a material of preferred characteristics with respect to the requirements to be met by a hinge material any disadvantages typically associated with conventional approaches for connecting a hinge material and an actual datapage may be significantly mitigated.

In this respect it should be appreciated that non-planar surface portions of an end face of at least one intermediate sheet of a datapage are to be understood as any surface configuration deviating from a substantially planar surface configuration, as typically used in intermediate or central sheets of datapages of conventional products, except for any surface roughness caused by preparing and processing respective materials. That is, non-planar surface portions, which in combination with the hinge material including a potential adhesive material may result in an "interdigitated" structure between the hinge material and the datapage material, may thus include any type of protrusions and/or recesses having a characteristic geometric metric of at least several micrometers up to several tens of micrometres or several mm. For example, a respective characteristic geometric metric may be represented by a height or depth of a corresponding imaginary or average surface area when all of the respective non-planar surface portions would be levelled. In some illustrative embodiments disclosed herein, a respective characteristic geometric metric may be in the range of +−30% of a thickness of the respective intermediate sheet. It should be appreciated that the interdigitated structure may be obtained by only providing the non-planar surface portions on the end face of the one or more intermediate sheets of the datapage, wherein a respective adaptation of the hinge material to the modulated surface of the end face may be accomplished by a formation process and/or a glue or adhesive material that may be highly deformable in a non-cured state and may be considered, after curing, as part of the hinge material for representing the complementary structure at the side of the hinge material in order to provide the interdigitated structure that includes the complementary structure at the side of the hinge material and the non-planar end face of the datapage material.

Advantageously, at least one, preferably both, cover sheets may extend beyond the one or more intermediate or central sheets having the end face of non-planar configuration, so that at least one further surface area is available for connecting to the hinge material.

In other illustrative embodiments, one or more contact surface areas provided by the one or more cover sheets may also have included therein non-planar surface portions in order to provide for even a further increased adhesion strength when connecting to a hinge material.

As will be discussed in more detail later on, a plurality of basic geometric configurations for the end face at the side of the datapage may be applied so as to form the interdigitated structure of increased contact surface area in combination with an appropriately selected hinge sheet.

With reference to the accompanying drawings further illustrative embodiments of the present disclosure will now be described in more detail.

FIG. 1A schematically illustrates a perspective view of a security document 190, such as a passport, and the like, that includes at least one datapage 100 forming a connecting portion 140 in combination with a hinge material or sheet that is not shown in FIG. 1A. The connecting portion 140 may serve to compile a plurality of sheet or pages of the security document 190 in any desired manner, for instance in the form of a booklet, and the like. As discussed above, frequent use of the security document 190 may require a frequent opening and closing of the document 190. Therefore, in addition to other properties as already discussed above, the datapage 100 has a specific configuration so as to enable the provision of the connecting portion 140 with superior performance, in particular in terms of mechanical robustness.

Figure 1B:
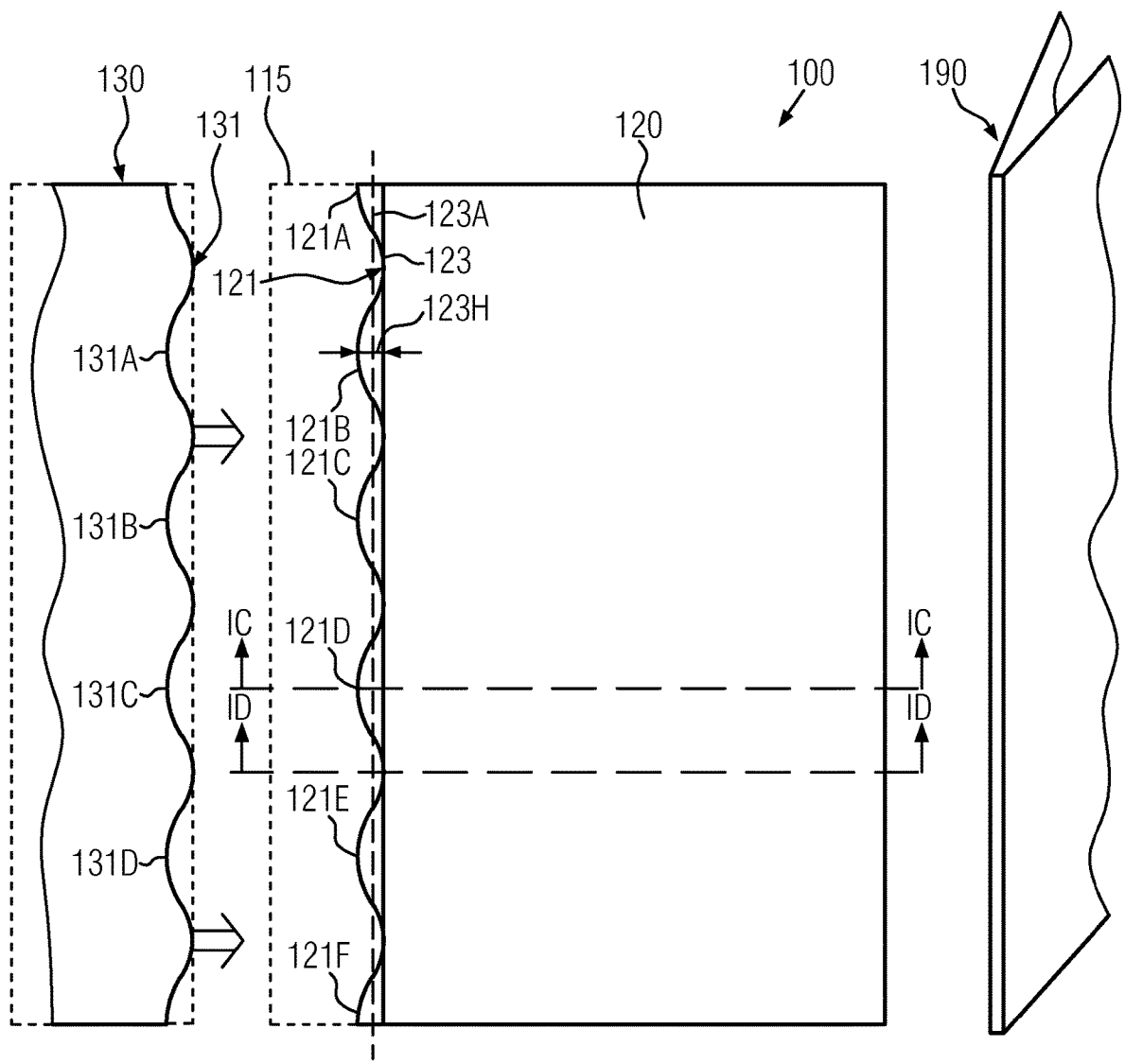
FIG. 1B schematically illustrates an exploded top view of the datapage and the hinge material sheet to be connected to the datapage according to illustrative embodiments of the present disclosure.

FIG. 1B schematically illustrates an exploded top view of the datapage 100 that is used in the security document 190, such as a passport, and the like, schematically illustrated at the right hand side of FIG. 1B.

The datapage 100 may include a bottom cover sheet 115 and a top cover sheet that for convenience is not shown in FIG. 1B. The cover sheet 115 is shown in dashed lines, while a lower lying sheet, such as an intermediate or central sheet 120 is illustrated in solid lines. The one or more intermediate sheets 120 may have an appropriate size and shape so as to meet the respective requirements of the security document 190. Furthermore, the intermediate sheet 120 may be formed of an appropriate material, preferably a tampering resistant material, such as polycarbonate, and the like. As discussed above, the one or more intermediate sheets 120 may have incorporated therein or sandwich or in any other way carrying sensitive information or data, which, after performing a respective lamination process, may therefore be incorporated in the datapage 100, thereby providing for high tampering resistance, and the like, as discussed above. The one or more intermediate sheets 120 may have respective contact surface areas in contact or to be contacted with the one or more cover sheets, such as the bottom cover sheet 115, and may have additionally an end face 121, against which a hinge material sheet 130 is to be abuted upon connecting the hinge material sheet 130 with the remaining portion of the datapage 100. In the following, the hinge material sheet 130 may be considered as a part of the datapage 100, if appropriate. In FIG. 1B, the hinge material sheet 130 is shown so as to have a complementary configuration with respect to the end face 121 of the intermediate sheet 120. This complementary structure may be obtained during the assembling process by means of a glue or adhesive material, while in other cases the hinge sheet may be provided with a non-planar end face per se prior to the connection to the datapage 100.

The end face 121 may have a non-planar surface defined by respective surface portions 121A, . . . , 121E, which may have any appropriate geometric size and shape so as to generally increase the resulting surface area of the end face 121. For example, as shown, the non-planar surface portions 121A, . . . , 121E may represent portions of circles, triangles, and the like, in the top view of FIG. 1B. That is, in a thickness direction, i.e. in FIG. 1B a direction perpendicular to the drawing plane of FIG. 1B, the portions extend in the form of "columns", the cross-sections of which are illustrated in FIG. 1B.

Furthermore, in FIG. 1B the plurality of non-planar surface portions 121A, . . . , 121E is illustrated as representing a plurality of regularly shaped components defined by at least one geometric meaningful metric, such as a "height" 123H that may define the distance of a vertex or point of greatest distance with respect to an appropriate baseline 123A of the end face 121. For example, the respective baseline 123A may be represented by planar surface portions 123 or may be represented, as illustrated in the drawing, by an imaginary line that would be obtained by levelling the non-planar surface portions 121A, . . . , 121E, as for instance indicated by the dashed line 123A. Consequently, as indicated by the line 123A or the portions or points 123 the resulting surface area of the end face 121 is significantly increased due to the non-planar surface portions 121A, . . . , 121E compared to corresponding surface area that would be obtained when the end face 121 would be only formed by the surface as represented by the lines 123, 123A. That is, when considering the overlapping configuration, i.e., the overlapping zone defined by the one or more cover sheets 115 in combination to the one or more intermediate sheets 120 having the end face 121, a corresponding contact surface area for connecting to the hinge material sheet 130 is significantly increased compared to conventional approaches. In the conventional approaches the outer surface areas of a rectangular geometrical object would be defined by the inner surfaces of the cover sheets 110 and the planar surface area of the end face, as defined by the lines 123A of 123, whereas the spatially modulated end face 121 according to the principles disclosed herein provides for an overall increased contact area with the hinge material sheet 130.

The hinge material sheet 130 may, as shown in the exploded view of FIG. 1B, also comprise an end face 131 having a complementary geometric configuration compared to the end face 121 of the one or more intermediate sheets 120. Therefore, the end face 131 may comprise respective non-planar portions 131A, . . . , 131E that match the shape of the end face 121 and thus tightly connect to the respective non-planar portions 121A, . . . , 121. As already discussed above, the end face 131 be formed by a specific hinge material in combination with any glue or adhesive material, if required, wherein the non-planar end face 131 may be formed substantially completely of the glue or adhesive material, while in other cases, the hinge material sheet 130 may be pre-processed so as to provide the end face 131 in a pre-contoured manner. In still other cases, the hinge material may itself be shaped upon being connected to the end face 121, for instance, by applying heat and pressure, so as to form the end face 131. Consequently, in cases, in which a complementary geometric configuration of the end face 131 may not be prepared in advance, the process of preparing the hinge material sheet 130 is simplified and the actual configuration of the end face 131 is accomplished during the process of actually attaching the hinge material sheet 130 to the datapage 100. On the other hand, a pre-configuration of the end face 131 may result in a reduction of the amount of glue or adhesive material required, if any such materials may have to be used in connecting the hinge material sheet 130 to the datapage 100.

FIG. 1C schematically illustrates a cross-sectional view of the datapage 100 according to the section as indicated IC in FIG. 1B. As illustrated, the datapage 100 comprises a cover sheet 110 and the cover sheet 115, which form, in combination with the one or more intermediate or central material sheets 120, a respective layer stack. It should be appreciated and as will be described later on in more detail, the layer 120 may represent a single layer or may represent two or more distinct layers, at least one of which may comprise the non-planar end face 121, as already discussed above.

Furthermore, in the embodiment shown in FIG. 1C the cover sheets 110 and 115, at the side of the non-planar end face 121, extend beyond the one or more intermediate sheets 120, thereby forming the connecting portion 140 as an overlapping portion. That is, a respective hinge material sheet, such as the material sheet 130 as illustrated in FIG. 1B, may be inserted into the area defined by the overlapping portions of the cover sheets 110, 115 and the non-planar end face 121 in order to form the respective connecting portion 140. For example, as illustrated, the hinge material sheet 130 having the cross section of FIG. 1C, for instance including a top layer, engages with a respective portion, such as portion 131C, with the protruding portion 121D that is raised with respect to the base line 123A, thereby forming a highly interdigitated structure. For example, the distance 123H may represent a geometric measure for characterizing the height dimension of the one or more protrusions 121A, . . . , 121E (cf. FIG. 1B). As will be discussed later on in more detail, in other illustrative embodiments the non-planar end face 121 may comprise any appropriate pattern in order to provide an increased contact surface area for the hinge material (not shown) so that several geometric measures may be used for characterizing the configuration of a respective end face.

FIG. 1D schematically illustrates the cross-sectional view of the datapage 100 according to the section line indicated as ID of FIG. 1B. As illustrated, a respective surface area of the end face 121, such as the surface area 123, is recessed with respect to the base line 123A, while in other cases, the surface portion 123 may itself be used as a baseline, as discussed above in the context of FIG. 1B. Hence, the hinge material sheet 130 may engage with its end face 131 with the end face 121.

Figure 2A:
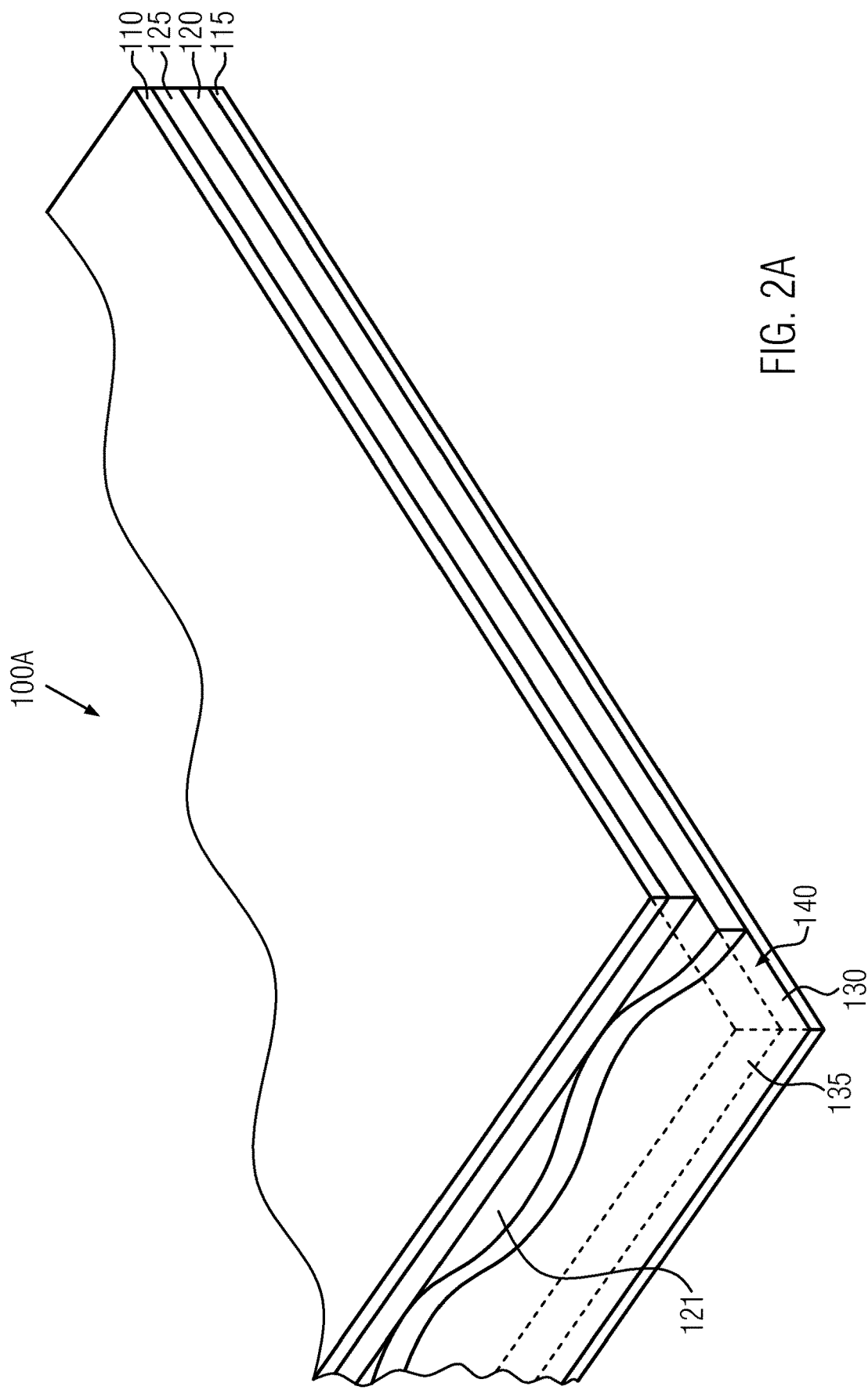
FIGS. 2A and 2B schematically illustrates perspective views of a datapage having an end face in one of two central sheets thereof (FIG. 2A) and in one of three central sheets thereof (FIG. 2B) as to increase the overall contact surface.

FIG. 2A schematically illustrates a perspective view of a datapage 100A according to still further illustrative embodiments. As shown, the datapage 100A may have a similar configuration as the previously described datapage 100 (cf. FIG. 1B) and, therefore, similar or same elements are denoted by the same reference numerals. Consequently, the datapage 100A may comprise the intermediate sheet 120 having the end face 121 with a non-planar surface configuration, as discussed above. Furthermore, a further intermediate or central sheet 125 may be provided on the basis of any appropriate material, such as polycarbonate, with specific characteristics as demanded by the corresponding use case of the datapage 100A. Furthermore, the cover sheets 110 and 115 are formed on top of the sheets 125, 120, thereby forming a layer stack 150A in accordance with the overall document requirements. Furthermore, the connecting portion 140, as formed by the hinge material sheet 130 having a top layer 135, connects to the respective areas of the datapage 100A so as to provide for the increased contact surface area, as discussed above.

Figure 2B:
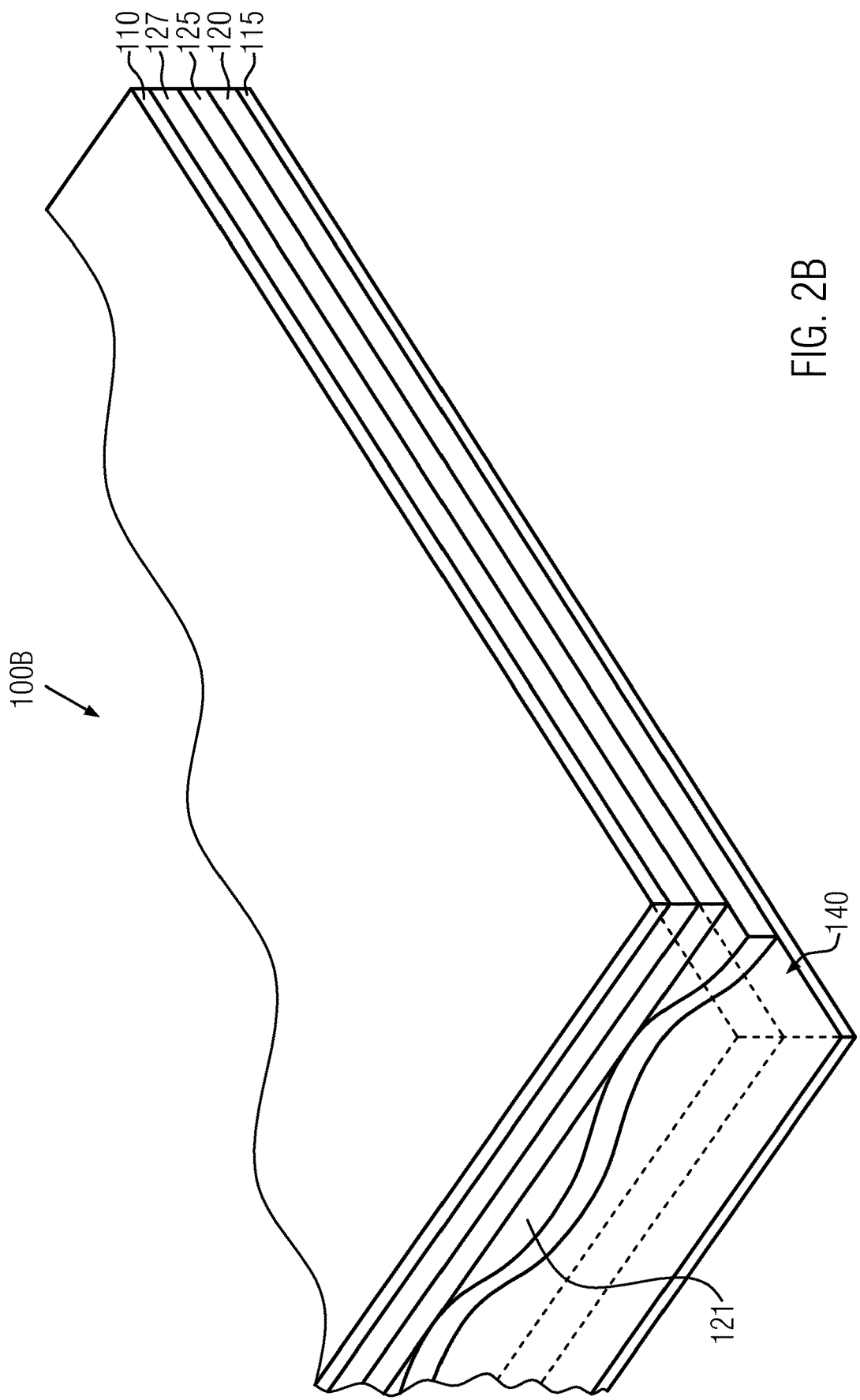

FIG. 2B schematically illustrates a perspective view of a datapage 100B in combination with the connecting portion according to a further illustrative embodiment, wherein compared to the datapage 100A of FIG. 2A a further intermediate sheet 127 in addition to the sheets 120, 125 may be provided in order to accommodate the specific requirements of the respective security document, for which the datapage 100B is designed. Consequently, together with the cover sheets 110, 115 the intermediate sheets 120, 125, 127 may form a layer stack 150B adapted to the specific requirements of the datapage 100B, for instance in terms of incorporation of security features, and the like. It should be appreciated that depending on the specific characteristics of the various intermediate sheets 120, 125, 127 the respective thickness of these sheets may appropriately be adapted to the intended use case. Furthermore, in the embodiment shown in FIG. 2B the sheet 120 may comprise the non-planar end face 121, while the sheets 125, 127 may have respective "smooth" or planar end faces. In other illustrative embodiments (not shown) one or more of the additional sheets 125, 127 may also comprise a non-planar end face, in some embodiments, with different geometric configuration compared to the end face 121, thereby additionally increasing the overall contact surface area upon connecting to an appropriate hinge material, as discussed above.

With reference to FIGS. 3A to 3H the geometric configuration of the respective end faces will now be described in more detail according to still further illustrative embodiments. It should be appreciated that for the sake of conciseness again the same reference numerals will be used for similar or like elements.

Figure 3A:
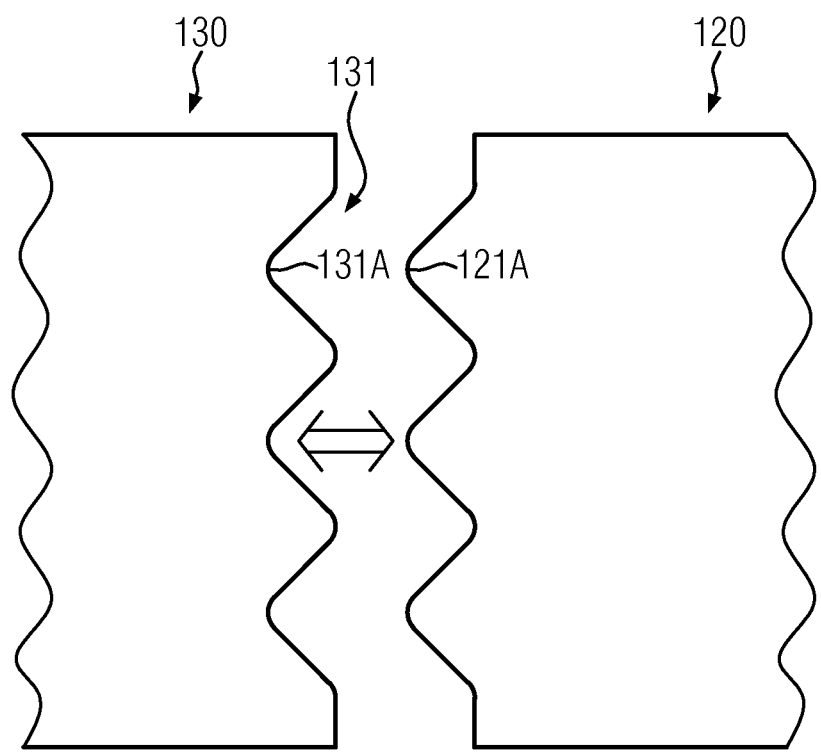
FIGS. 3A and 3B schematically illustrate top views of datapages and respective hinge materials to be connected thereto for forming an interdigitated structure according to illustrative embodiments.

FIG. 3A schematically illustrates a top view of an intermediate sheet, such as one of the intermediate sheets 120 previously described, and a hinge material sheet, such as the sheet 130, as previously described. Consequently, the intermediate sheet 120 may comprise the end face 121 having the non-planar configuration, as discussed above, here in form of wave-like elements, while the hinge material sheet 130 may comprise the end face 131 having a complementary configuration compared to the end face 121. For example, a protrusion 121A of the end face 121 may correspond to a respective recess 131A of the end face 131, and the like. It should be appreciated that, although the protrusions 121A of the end face 121 are illustrated as representing a substantial regular pattern, in other cases, any type of pattern, such as a random pattern, may be used. Furthermore, as already discussed above, the end face 131 having the non-planar configuration including the complementary portions 131A may substantially be formed within a specific hinge material, such as a non-woven, possibly in combination with any glue or adhesion material, if required for mechanically connecting the end face 131 to the end face 121. Therefore, upon preparing the hinge material sheet 130 a certain degree of pre-forming may be applied so as to obtain the substantially complementary configuration of the end face 131. It should be appreciated, however, that an exact match of the configurations of the end faces 121 and 131 may not be necessary, since a respective "form closure" may be accomplished upon processing the sheets 120, 130 when performing the respective connection process, such as a lamination process, and the like.

Figure 3B:
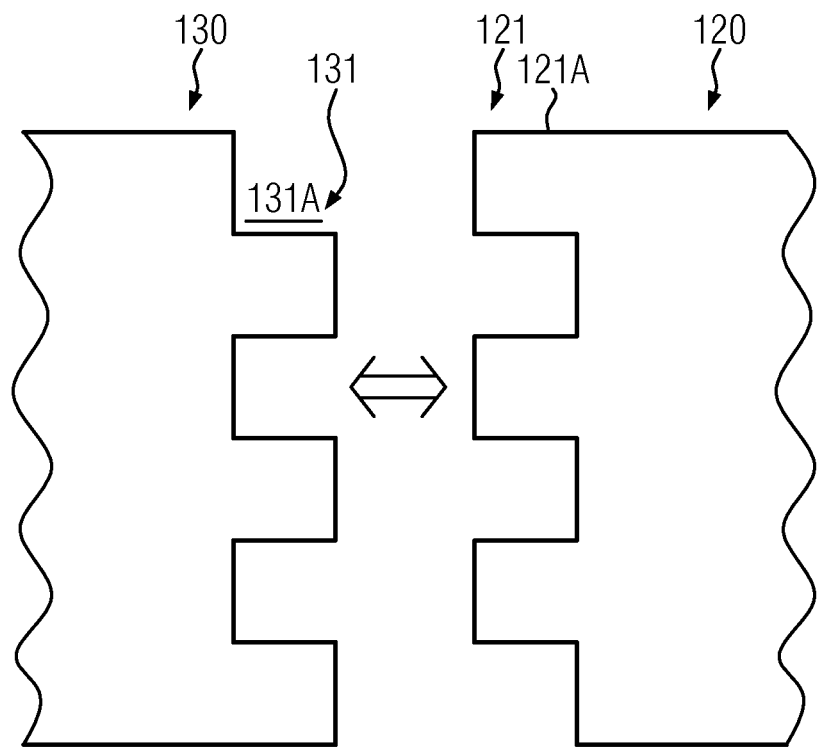

FIG. 3B schematically illustrates a top view of the intermediate sheet 120 and the hinge material sheet 130 a different type of non-planar configuration. Contrary to the relatively gently curved portions 121A, 131A FIG. 3A the respective portions 121A, 131A of FIG. 3B may include relatively sharp corners, such as a rectangle-type configuration, wherein also complementary recessed portions 131A of the end face 131 may correspond to respective protruding portions 121A of the end face 121. As discussed above, the end face 131 may be pre-processes to a certain degree upon preparing the hinge material sheet 130.

FIGS. 3C to 3H schematically illustrate views of the intermediate sheet 120 and the sheet 130 according to various geometric configurations of the respective end face 121, while the end face 131 of the hinge material sheet 130 may be represented by a substantially smooth surface or by any other non-planar configuration, the overall shape of which may be non-correlated to the geometric configuration of the interface 121.

Figure 3C:
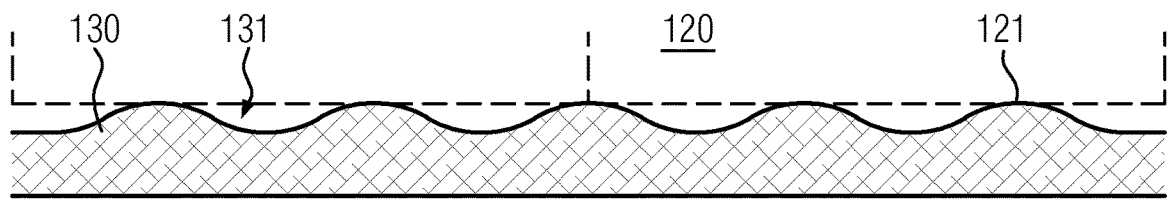
FIGS. 3C to 3H schematically illustrate top views of datapages with end faces of different basic geometries for forming an interdigitated structure with a hinge material according to illustrative embodiments.

FIG. 3C illustrates the interface 121 having a non-planar configuration with gently curved protrusions and recesses, that is, a wave-like pattern, with substantially regular configuration along a width direction, i.e., in the horizontal direction of FIGS. 3A to 3H. Regarding the size and a characteristic measure for specifying the non-planar configuration of the end face 121 it is referred to the above discussion.

Figure 3D:
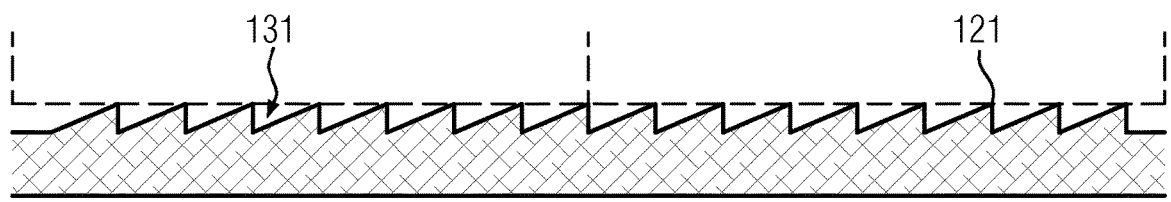

FIG. 3D schematically illustrates the interface 121 with a substantially regular non-planar configuration, which may be characterized by a substantially saw tooth-like pattern with relatively sharp corners. Also in this case, the height of respective portions of the saw tooth-like structure may be obtained in accordance with the discussion provided above.

Figure 3E:
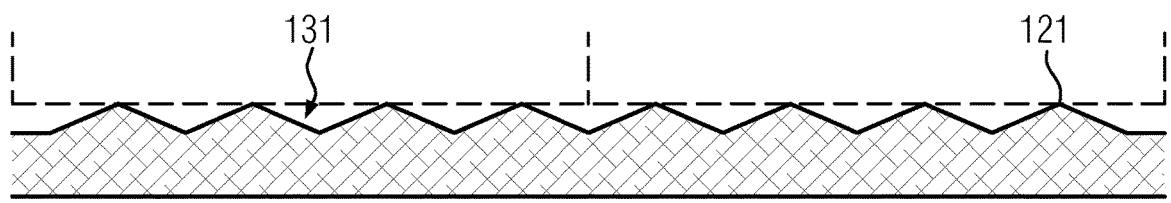

FIG. 3E schematically illustrates a substantially regular non-planar configuration, which may be characterized as a triangle-like pattern, wherein the respective individual protrusions or raised portions may be represented by substantially equal-sided triangles.

Figure 3F:
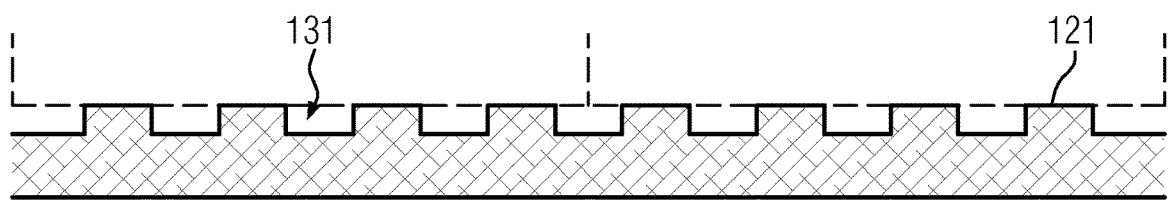

FIG. 3F schematically illustrates the end face 121 with substantially rectangular portions, which may be characterized as a square-like structure.

Figure 3G:
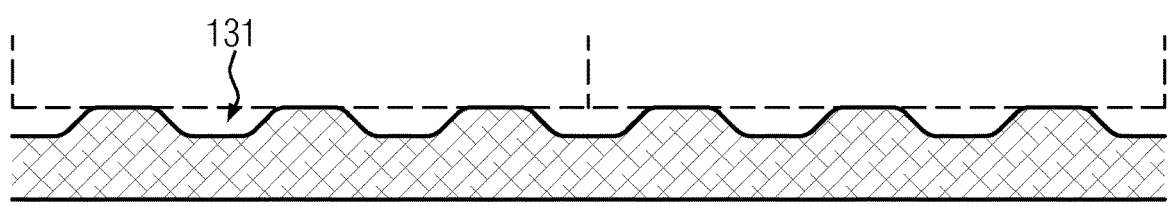

FIG. 3G schematically illustrates the end face 121 with a type of protrusions that may be defined by a regular pattern with corners of increased curvature, that is, less wave-like, compared to the structure of FIG. 3C and with reduced curvature compared to the structures as shown in FIGS. 3D, 3E and 3F.

Figure 3H:
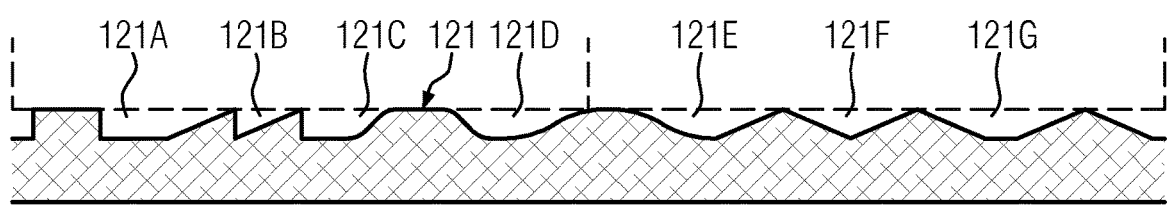

FIG. 3H schematically illustrates the end face 121 with a pattern obtained by a more complex regular structure or a substantially irregular structure. In the example shown in FIG. 3H, the interface 121 may be considered as being composed of different types of protrusions and recesses as discussed in the context of FIGS. 3C to 3G. For example, portions 121A may be represented by square-like components, while portions 121B may represent parts of the saw tooth-like pattern of FIG. 3D. Similarly, portions 121C may represent respective portions of the pattern as shown in FIG. 3G, while portions 121D may be similar to the triangles as shown in FIG. 3E.

It should be appreciated that the various geometric configurations referred to in FIGS. 3A to 3H merely represent examples for obtaining an increased contact surface area so as to finally form and interdigitated structure with a corresponding hinge material, possibly in combination with any glue or adhesive material, as discussed above. Consequently, any type of surface configuration may be implemented at the end face 121 in order to obtain a non-planar configuration that guarantees an increased contact surface area when being connected to a respective hinge material sheet.

Figure 4A:
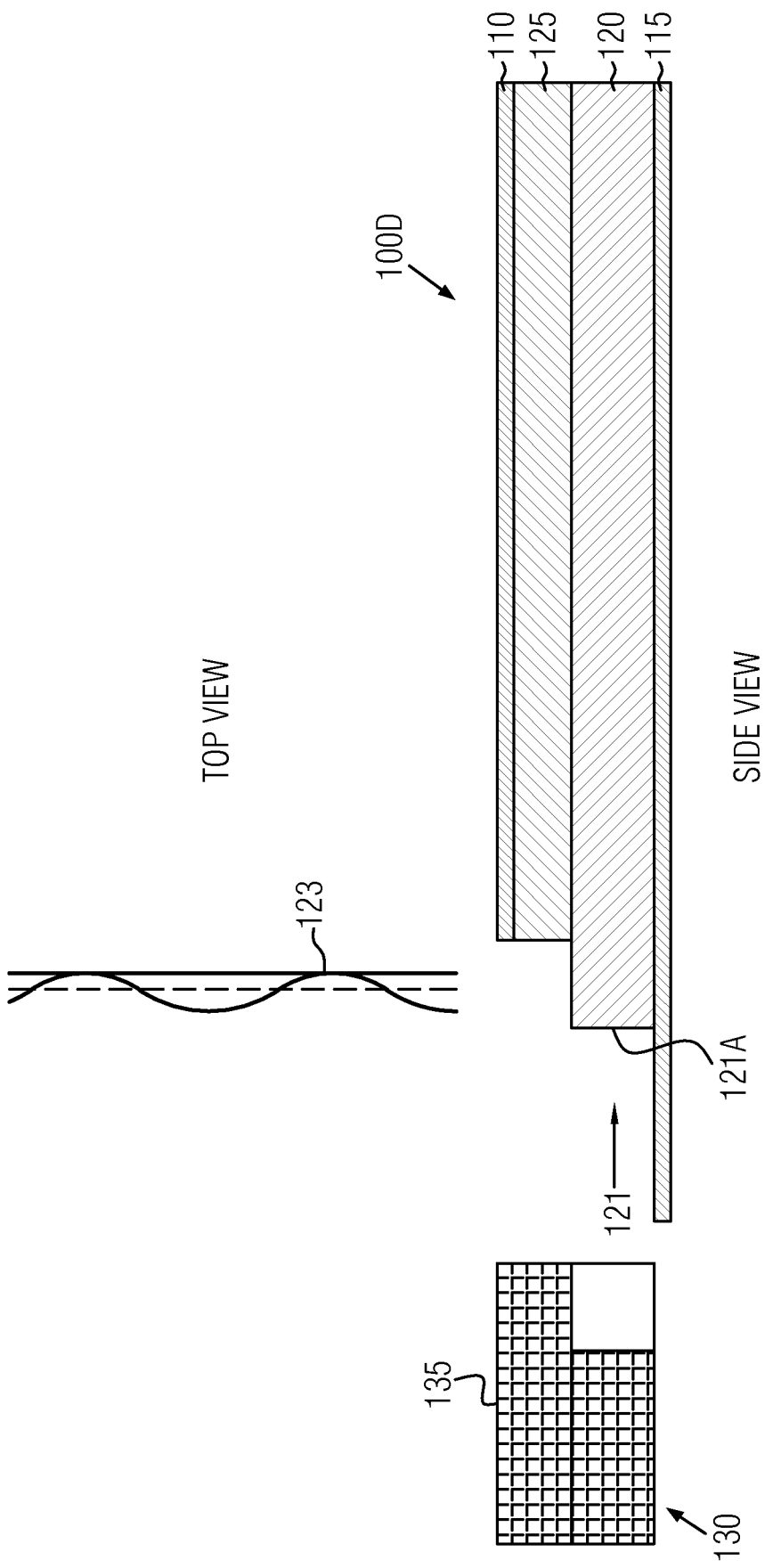
FIGS. 4A and 4B schematically illustrate cross-sectional views of datapages with non-planar end faces or top face portions of respective top and/or intermediate sheets in order to increase the overall contact surface area to a hinge material in forming a "three-dimensionally" interdigitated structure and thus provide for superior adhesion strength and durability according to still further illustrative embodiments.

FIG. 4A schematically illustrates a cross-sectional and exploded view of a datapage 100D in combination with a hinge material sheet 130 including a top layer 135. The datapage 100D provides for an even further increased contact surface area upon being connected to a hinge material sheet. For the sake of convenience, also in this case similar or like elements as in the preceding embodiments will be denoted by the same reference numerals.

As illustrated, the datapage 100D may comprise the cover sheets 110, 115, which sandwich the intermediate layer 120 that may have the end face 121 of non-planar configuration, as for instance schematically illustrated due to a recessed portion 121A, as is also discussed above. Furthermore, a further intermediate sheet 125 may be provided, which may have the same width extension, i.e. in FIG. 4A the horizontal extension of the sheet 125, compared to the intermediate sheet 120. Consequently, along a height or thickness direction, i.e. in FIG. 4A the vertical direction, a corresponding overall stepped configuration is obtained at the side of the end face 121 of the sheet 120 due to the protruding and recessed areas 121A, wherein a respective end face of the intermediate sheet 125 further contributes to the overall contact surface area. Consequently, the overall contact surface area for connecting to the hinge material 130 may be further increased due to the stepped configuration. However, in some illustrative embodiments, not illustrated in FIG. 4A, the end face of the layer 125 may also be provided in a non-planar configuration, which may interact with a corresponding portion of an end face of the hinge sheet material 130 to be connected to the datapage 100D. It should be appreciated that the end face 121 may have any desired geometric configuration, as for instance previously discussed with reference to FIGS. 3A to 3H, wherein the respective surface patterns may be similar or very different, depending on the overall requirements. The same holds true for an end face of the layer 125, if provided as a non-planar surface.

Figure 4B:
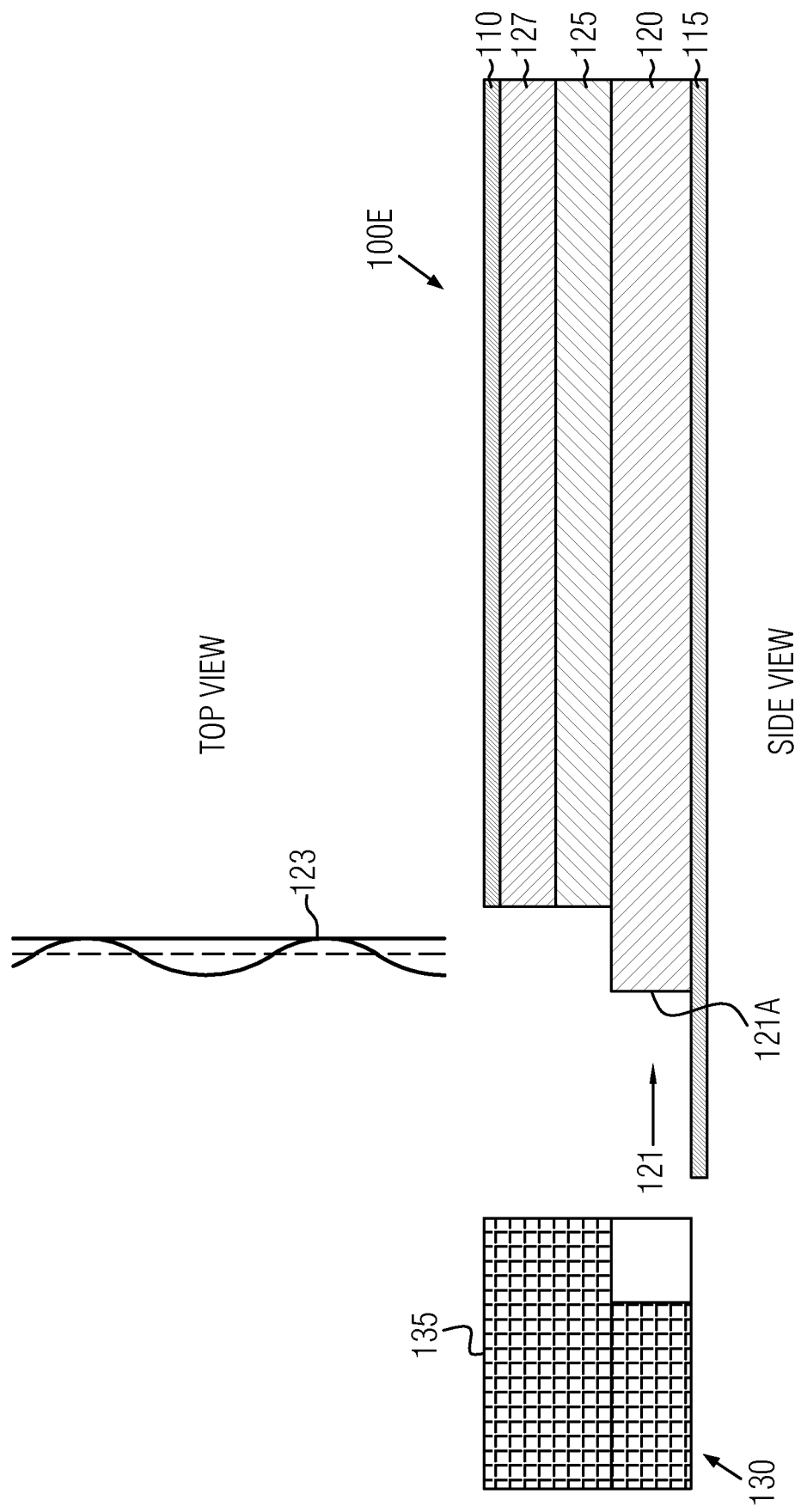

FIG. 4B schematically illustrates a cross-sectional view of a datapage 100E, in which in addition to the intermediate sheet 120 and 125 a further intermediate sheet 127 may be provided. Also in this case, for the sake of convenience the same reference numerals are used for components that correspond to previously described components.

Also in this case, the intermediate sheet 120 may comprise the end face 121 having the non-planar configuration, for example represented by the recess 121A, as discussed above. Furthermore, the intermediate sheets 125, 127 may have substantially smooth end faces, i.e., planar end faces, respectively, wherein, in some embodiments, as shown, for further increasing the overall contact surface area with a hinge material to be connected to the datapage 100E, a stepped configuration may be established so as to expose a respective surface area of the sheet 120, also discussed in the context of FIG. 4A. In other embodiments (not shown), the intermediate sheets 125 and 127 may be implemented with a different and reduced extension along a width direction, i.e. in FIG. 4B the horizontal direction, compared to the intermediate sheet 120 and the sheets 125 and 127 may have different extensions to each other. In this way a "double-step" configuration may be obtained, if the horizontal extension of the sheet 127 is less than the horizontal extension of the sheet 125, and a "bracket-like" configuration may be obtained, if the horizontal extension of the sheet 127 is greater than the horizontal extension of the sheet 125.

Basically, the process for forming the various datapages discussed above in the context of FIGS. 1-4 may be carried out by pre-processing one or more intermediate sheets so as to obtain the non-planar end faces. The one or more intermediate sheets may then be stacked in combination with one or more cover sheets so as to obtain a desired overall layer stack for the datapage under consideration. A respective lamination process may be performed so as to convert the respective datapages into a homogeneous material block satisfying the respective security aspects, as for instance discussed above.

An appropriate hinge material may be prepared, in the form of a respective sheet and may be connected to the datapage by any appropriate process techniques, such as gluing, welding, adhesive material in combination with heat treatments, and the like, so as to obtain the interdigitated structure of a respective connecting portion, wherein material of the hinge, possibly in combination with any glue or adhesive material, is interdigitated with the material of the datapage at the respective end face thereof, while also a connection is established on any other surface portions of the datapage that are in contact with respective surface portions of the hinge material. Moreover, as discussed in the context of FIGS. 4A, 4B the resulting overall contact surface area of a respective connecting portion may still further be increased by providing a stepped configuration at the side of the end faces of the respective intermediate sheets and/or by providing at least one further intermediate sheet with a respective non-planar interface to be connected to a respective end face portion of the hinge material.

Furthermore, in illustrative embodiments, various requirements with respect to structural integrity, robustness of the connection between hinge material and datapage, and the like, may be taken into consideration upon designing different types of non-planar configurations for the end face of the one or more intermediate sheets, possibly in combination with respective complementary structures, if required, at an end face of the hinge material, and a respective configuration resulting in an interdigitated connection structure may then be selected, for instance based on experiments, and the like, so as to comply with the respective pre-established requirements.

As a result, the present disclosure provides security documents and datapages, in which a reliable mechanical connection between datapage and the remainder of the security document may be established by using an appropriate hinge material selected and designed in view of a superior performance so as to form a connecting portion including an interdigitated structure that connects hinge material, possibly in combination with glue or adhesive material, and the material of one or more intermediate sheets of the datapage. In this manner a high degree of integrity of the datapage and a robust mechanical connection to the remainder of the security document may be achieved.

The invention claimed is:

1. A datapage for a security document, comprising
a first cover sheet;
a second cover sheet;
an intermediate sheet sandwiched by said first and second cover sheets, said intermediate sheet having an end face for connecting to a hinge material sheet, said end face having non-planar surface portions,
wherein at least one of said first and said second cover sheets has a surface contact section that serves for connecting it to said hinge material sheet, and said surface contact section further comprises non-planar contact surface portions.

2. The datapage of claim 1, wherein at least one of said first and second cover sheets extends beyond said end face.

3. The datapage of claim 2, wherein both said first cover sheet and said second cover sheet extend beyond said end face.

4. The datapage of claim 1, wherein said non-planar surface portions of said end face are formed by at least one of a plurality of protrusions and a plurality of recesses.

5. The datapage of claim 1, wherein said non-planar surface portions are configured as a saw-tooth type structure.

6. The datapage of claim 1, wherein said intermediate sheet is made of polycarbonate.

7. The datapage of claim 6, wherein said first and second cover sheets are made of polycarbonate.

8. The datapage of claim 1, further comprising said hinge material sheet connected to at least said end face.

9. The datapage of claim 8, wherein said first and second cover sheets overlap with said hinge material sheet and are connected therewith.

10. The datapage of claim 8, wherein said hinge material sheet and said intermediate sheet are formed of different materials.

11. The datapage of claim 10, wherein said hinge material sheet comprises a non-woven material.

12. The datapage of claim 8, wherein said intermediate sheet and said hinge material sheet form an interdigitated structure at said end face.

13. A datapage for a security document, comprising
a first cover sheet;
a second cover sheet;
an intermediate sheet sandwiched by said first and second cover sheets so as to expose an end face of said intermediate sheet; and
a hinge material sheet connected to said intermediate sheet by said end face so as to form a connection portion of interdigitated structure,
wherein at least one of said first and said second cover sheets has a surface contact section that serves for connecting it to said hinge material sheet, and said surface contact section further comprises non-planar contact surface portions.

14. The datapage of claim 13, wherein said intermediate sheet is formed of a first material and said hinge material sheet is formed of a second material that differs from said first material.

15. The datapage of claim 13, further comprising a further intermediate sheet stacked on said intermediate sheet and sandwiched by said first and second cover layers.

16. The datapage of claim 15, wherein said further intermediate sheet comprises a further end face connected to said hinge material sheet.

17. The datapage of claim 16, wherein said end face and said further end face are offset to each other with respect to said hinge material sheet.

18. The datapage of claim 16, wherein said further end face forms a further connection portion of interdigitated structure with said hinge material sheet.

19. A method of forming a datapage for a security document, the method comprising
providing a first cover sheet, a second cover sheet and at least one intermediate sheet having a contact end face, said contact end face having non-planar surface portions;
stacking said first cover sheet, said second cover sheet and said at least one intermediate sheet so as to arrange said at least one intermediate sheet between said first and second cover sheets, said first and second cover sheets extending beyond said contact end face so as to form overlapping contact surface portions;
connecting a hinge material sheet to said contact surface portions of said first and second cover sheets and to said contact end face of said intermediate sheet,
wherein said contact end face forms an interdigitated structure with said hinge material sheet, and
said contact surface portions comprise non-planar contact surface portions in order to provide increased adhesion strength when connecting to said hinge material.

* * * * *